Figure 1:
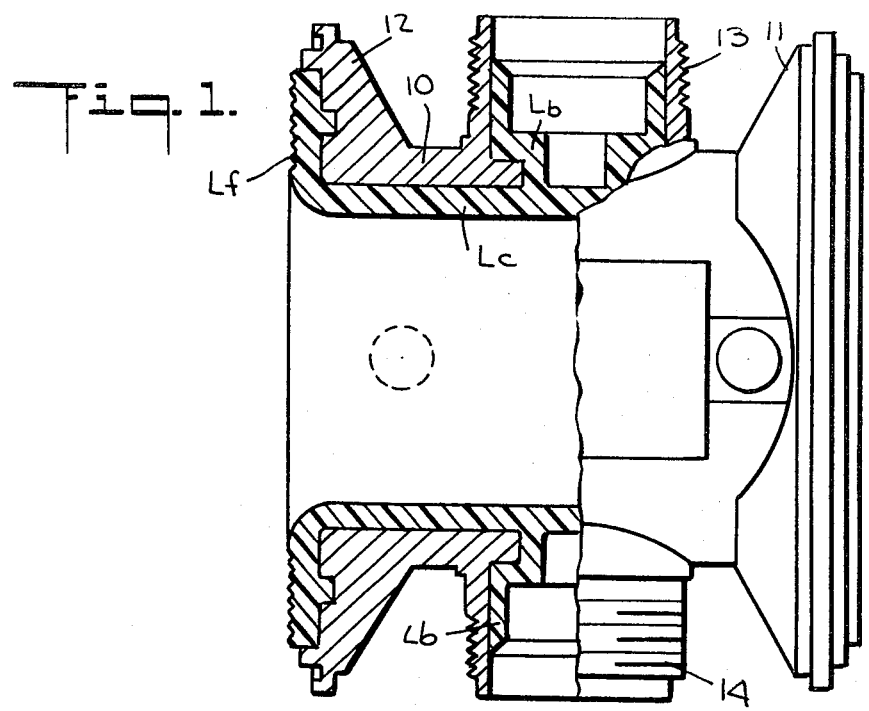

United States Patent [19]

Davis et al.

[11] 4,403,933
[45] Sep. 13, 1983

[54] APPARATUS FOR INJECTION-MOLDING A LINER ONTO A METAL SPOOL

[75] Inventors: James W. Davis, New Britain; Elmer D. Mannherz, Southampton, both of Pa.

[73] Assignee: Fischer & Porter Company, Warminster, Pa.

[21] Appl. No.: 368,410

[22] Filed: Apr. 14, 1982

[51] Int. Cl.³ .............................................. B29F 1/10
[52] U.S. Cl. ................................ 425/129 R; 264/269; 264/328.9; 264/328.12; 425/572; 425/573
[58] Field of Search .................... 425/129 R, 572, 573, 425/588, DIG. 51; 264/269, 328.9, 328.12; 249/107, 110

[56] References Cited

U.S. PATENT DOCUMENTS

| | | | |
|---|---|---|---|
| 2,330,369 | 9/1943 | Marsh | 425/572 |
| 2,524,858 | 10/1950 | Thomas | 425/DIG. 51 |
| 2,914,800 | 12/1959 | Morin | 425/588 |
| 3,989,436 | 11/1976 | McNeely et al. | 425/572 |
| 4,091,057 | 5/1978 | Weber | 264/2.2 |
| 4,115,505 | 9/1978 | Metabi | 425/129 R |
| 4,284,591 | 8/1981 | Neefe | 264/2.2 |

*Primary Examiner*—Donald E. Czaja
*Assistant Examiner*—Mary A. Becker
*Attorney, Agent, or Firm*—Michael Ebert

[57] ABSTRACT

An apparatus for injection-molding an insulating liner onto the surface of a metal spool to be included in an electromagnetic flowmeter in which the fluid to be metered is conducted through the lined spool. The spool is composed of a cylindrical body having end flanges and a pair of diametrically-opposed circular bosses disposed midway between the flanges to receive the meter electrodes. To carry out injection molding, the spool is supported within a mold which defines a liner cavity conforming to the inner surface of the cylindrical body and to the faces of the end flanges, the liner cavity communicating with cavities conforming to the inner surface of the electrode bosses. The molding material is injected into a sprue in the mold which runs along the longitudinal axis of the spool toward the hub of a runner extending radially toward an axisymmetric ring gate opening into the liner cavity at a point adjacent the boss cavities. The molding material passing through the ring gate then flows in opposite directions in the liner cavity to evenly fill this cavity as well as the boss cavities without creating weld lines therein.

7 Claims, 2 Drawing Figures

U.S. Patent  Sep. 13, 1983  4,403,933

APPARATUS FOR INJECTION-MOLDING A LINER ONTO A METAL SPOOL

BACKGROUND OF THE INVENTION

This invention relates generally to electromagnetic flowmeters, and more particularly to a technique for injection-molding an insulating liner onto the inner surface of a metal spool to define a flow conduit for the fluid being metered.

Magnetic flowmeters such as those disclosed in U.S. Pat. Nos. 3,695,104; 3,824,856; 3,783,687 and 3,965,783 are especially adapted to measure the volumetric flow rates of fluids which present difficult handling problems, such as corrosive acids, sewage and slurries. Because the instrument is free of flow obstructions, it does not tend to plug or foul. The flowmeter can be used to meter liquids without regard to heterogeneous consistency.

In a magnetic flowmeter, an electromagnetic field is generated whose lines of flux are mutually perpendicular to the longitudinal axis of the flow tube through which the fluid to be metered is conducted and to the transverse axis along which the electrodes are located at diametrically-opposed positions with respect to the tube. The operating principles are based on Faraday's law of induction, which states that the voltage induced across any conductor as it moves at right angles through a magnetic field will be proportional to the velocity of that conductor. The metered fluid effectively constitutes a series of fluid conductors moving through the magnetic field; the more rapid the rate of flow, the greater the instantaneous value of the voltage established at the electrodes.

In order to provide a compact and readily installable electromagnetic flowmeter whose weight and dimensions are substantially smaller than existing types, the Schmoock U.S. Pat. Nos. 4,253,340 and 4,214,477 disclose a highly compact flowmeter which, in spite of its reduced volume and weight, is capable of withstanding high fluid pressures. In the Schmoock flowmeter, use is made of a non-magnetic metal spool of high strength whose inner surface is lined with insulating material to define a flow conduit for the fluid to be metered. The spool also serves to withstand fluid pressure as well as the compressive forces to which the meter is subjected by bolts bridging the flanged ends of upstream and downstream pipes between which the unit is interposed.

Surrounding the Schmoock spool and concentric therewith is a cylindrical housing formed of ferromagnetic material. The housing is provided with annular end plates that are joined to the corresponding end flanges of the spool to define an inner chamber. Integral with the housing are two magnet cores which are placed at diametrically-opposed positions along an axis which is normal to the longitudinal axis of the housing coils being wound on these cores. A pair of electrodes are mounted on the spool at diametrically-opposed positions along a transverse axis at right angles to the core axis. The inner chamber is filled with a potting compound to encapsulate the electromagnets and the electrodes, the housing serving as a mold for this purpose.

Insulating liner for electromagnetic flowmeters are usually molded of fluorocarbon materials such as PTFE, PFA and FEP. Because fluorocarbons are non-reactive with virtually all corrosive fluids, they have the properties appropriate to liners for flowmeters. When injection-molding plastic liners into the body of metal spools of the type included in flowmeters disclosed in the Schmoock patents, certain problems are encountered.

One problem which occurs regardless of the nature of the molding material is when the molten thermoplastic material encounters an obstruction in its flow path, such as a core pin or an insert. The molten material is then forced to separate in order to flow around the obstruction; and in that situation, a weld or knit line will be formed where the two flow fronts join on the downstream side of the obstruction in the flow path. Such weld lines create weakened areas in the molded liner. Since the liner is subjected to fluid that may be under high pressure or include abrasive contaminants, the liner in some instances will in time be disrupted in the weakened areas.

Another problem arises in conventional injection-molding techniques when use is made of thermoplastic resin molding materials which have reinforcing fibers therein, such as TEFZEL, a fluoropolymer marketed by the DuPont company.

TEFZEL is the trademark covering a family of melt-processable thermoplastics (ETFE) with an outstanding balance of properties. Mechanically, TEFZEL is exceptionally tough, having excellent flex life, impact, cut-through and abrasion resistance. The glass fiber reinforced compound (Tefzel HT 2004) has even higher tensile and compressive strength, stiffness and creep resistance. Thermally, "Tefzel" has a continuous temperature rating of 150° C., the material being inert to most solvents and chemicals. It is an excellent low-loss dielectric with a uniformity of electrical properties normally absent with other thermoplastics.

The concern of the present invention is with "Tefzel" or other suitable thermoplastics having reinforcing fibers therein. In molding a fiber-reinforced thermoplastic material one must take into account fiber orientation. If the fibers in the molded flowmeter line are aligned in the direction of material flow which is parallel to the longitudinal axis of the meter, this orientation reduces material shrinkage in this direction and thereby prevents the liner from pulling away from the surface of the metal spool. But with conventional injection-molding techniques in which the liner is required to conform to the inner surface of the metal spool which is not purely cylindrical but includes shaped regions, the desired fiber orientation is not realized.

If, as is usually the case with conventional injection-molding techniques for liners, two flow fronts meet at a weld line, the fibers embedded in the molding material will lie parallel to the direction of flow. As a consequence there will be no fibers extending through the plane of the weld line. And because the plane of the weld line is then devoid of reinforcement, stresses thereafter exerted on the liner will concentrate at the weld line and result in failure.

SUMMARY OF THE INVENTION

In view of the foregoing, the main object of this invention is to provide an improved technique and apparatus for injection molding an insulating liner onto a metal spool to be included in an electromagnetic flowmeter, the lined spool defining a flow conduit for the fluid to be metered.

More particularly, an object of this invention is to provide a mold for carrying out a technique in accordance with the invention, the mold configuration being such as to cause the molding material to fill the cavity defining the liner in a manner avoiding the formation of weld lines that weaken the liner structure.

Also an object of the invention is to provide an injection-molding technique in which use is made of a glass fiber-reinforced ETFE molding material, the technique affording uniform fiber distribution and fiber orientation in the direction of material flow, so that no region of the liner is devoid of reinforcement and the liner is capable of withstanding heavy stresses.

Still another object of the invention is to provide an injection-molding technique for a metal spool having electrode bosses in which the liner is extended into the bosses, making it possible for the electrodes to be thereafter inserted from outside of the spool into the lined bosses which afford a compression seal therefor.

Briefly stated, these objects are attained in a technique for injection-molding an insulating liner onto the surface of a metal spool to be included in an electromagnetic flowmeter in which the fluid to be metered is conducted through the lined spool. The spool is composed of a cylindrical body having end flanges and a pair of diametrically-opposed circular bosses disposed midway between the flanges to receive the meter electrodes. To carry out injection molding, the spool is supported within a mold which defines a liner cavity conforming to the inner surface of the cylindrical body and to the faces of the end flanges, the liner cavity communicating with cavities conforming to the inner surface of the electrode bosses. The molding material is injected into a sprue in the mold which run along the longitudinal axis of the spool toward the hub of a runner extending radially toward an axisymmetric ring gate opening into the liner cavity at a point adjacent the boss cavities. The molding material passing through the ring gate then flows in opposite directions in the liner cavity to evenly fill this cavity as well as the boss cavities without creating weld lines therein.

OUTLINE OF THE DRAWINGS

Figure 2:
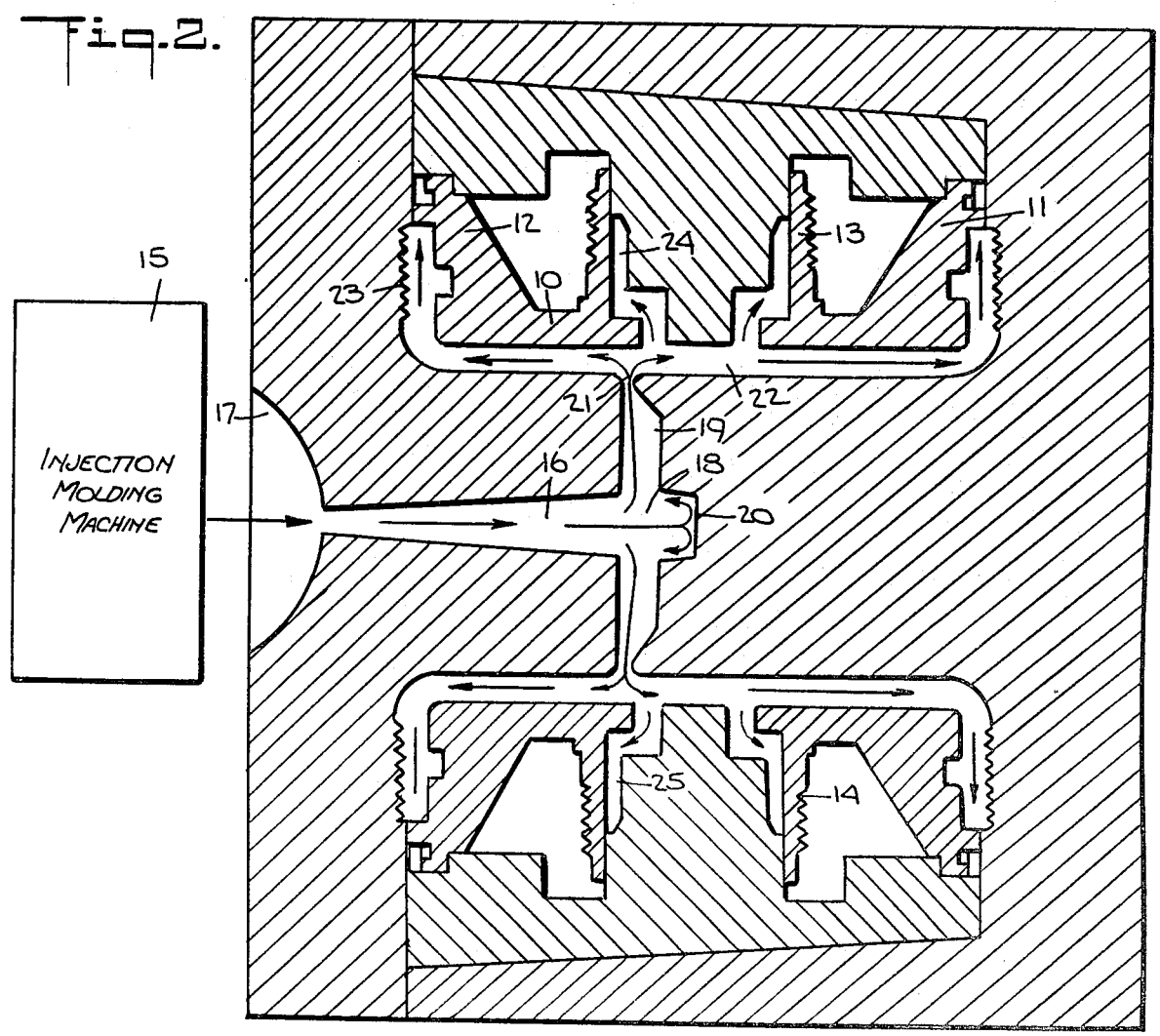

For a better understanding of the invention as well as other objects and further features thereof, reference is made to the following detailed description to be read in conjunction with the accompanying drawings, wherein:

FIG. 1 is an elevational view, partly in section, of the metal spool having a liner therein injection-molded by a technique in accordance with the invention; and FIG. 2, in section, illustrates the metal spool disposed within a mold in which molten plastic material is injected to create the liner for the spool.

DESCRIPTION OF THE INVENTION

Referring now to FIG. 1 there is shown a metal spool for inclusion in an electromagnetic flowmeter, onto which a liner has been injection-molded by a technique in accordance with the invention. The spool is constituted by a cylindrical body 10 having flanges 11 and 12 at either end, a pair of bosses 13 and 14 being disposed at diametrically-opposed positions on the spool body midway between the end flanges and being adopted to receive the meter electrodes. The liner is constituted by a cylindrical portion $L_c$ which conforms to body 10, flange portions $L_f$ conforming to the faces of the end flanges 11 and 12 and boss portions $L_b$ conforming to the electrode bosses 13 and 14.

In injection-molding, a thermoplastic molding compound is plasticized in an appropriate heating cylinder, then forced by plunger action through an orifice into relatively cool mold cavities where the material solidifies to the desired shape. The injection molding machine represented by block 15 in FIG. 2 is a self-contained unit consisting of various hydraulic, electrical and mechanical components which are adjustable to various molding requirements.

In practice, the granules of thermoplastic material are loaded into a feed hopper from which a controlled quantity is advanced into the heating cylinder with each complete cycle, the heating cylinder being surrounded by electrical heating coils. Since plastic materials are poor heat conductors, all injection-molding machines include some form of spreader located in the center of the plasticizing chamber to force the material close to the cylinder wall, thereby to assure uniform heating. To confine the material properly in the mold during the application of the high injection pressure, it is essential that an adequate clamping force be maintained against the mold.

FIG. 2 shows the metal spool symmetrically disposed within a mold in accordance with the invention formed by upper and lower halves. The mold is provided with a diverging or tapered sprue 16 which extends along the longitudinal axis of the spool from a concave inlet 17 into which is inserted the nozzle of the injection-molding machine 15. Sprue 16 leads into the central hub 18 of a radially-extending runner 19. Hub 18 is provided with an extension 20 which projects beyond runner 19 and acts as a cold well.

Runner 19 runs radially from hub 18 toward and axisymmetrical ring or flash gate 21. This gate opens into a liner cavity cavity 22 which conforms to the inner cylindrical surface of spool body 10 and to the faces of flanges 11 and 12. It will be seen that the walls 23 of the mold adjacent the faces of the flanges are corrugated to define a lining overlying the flange faces having corrugations therein constituted by concentric rings to provide a good seal when the flowmeter incorporating the metal spool is compressed between the flanges of the upstream and downstream pipes of the flow line in which the flowmeter is interposed.

The spool liner cavity 22 communicates with a pair of cavities 24 and 25 which conform to the inner surface of the electrode bosses 13 and 14. Ring gate 21 opening into liner cavity 22 at a point adjacent one side of the electrode bosses, the ring gate providing a 360 degree entry into this cavity.

OPERATION

The molten material injected into the mold through sprue 16 is a fiber-reinforced material such as TEFZEL. The liner material flows from the nozzle of the injection machine down the tapered sprue 16 into hub 18, the first "slug" of material being trapped and contained in cold well 20. The molten material then flows evenly in the radial direction through runner 19 toward ring gate 21. Plastic material flows simultaneously through the full 360 degrees of the ring gate into liner cavity 22.

As the molten material exits from ring gate 21, it then flows in the liner cavity 22 toward flange 12 and simultaneously toward flange 13 so that the plastic which proceeds to fill liner cavity 22 flows in opposite directions away from the entry gate. Thus flowing up and down the inner surface of the spool body through the liner cavity are concentric molten cylinders flowing away from each other. The electrode boss cavities are filled evenly in a similar fashion, these cavities being fed from the material flowing past the respective openings.

Because the ring gate is located near the center of the spool body, the reinforcing fibers in the flowing molten plastic material assume an orientation in the direction of material flow, this being parallel to the longitudinal axis of the spool as indicated by the arrows in FIG. 2. This orientation reduces material shrinkage in the axis direction and thereby prevents the liner flanges from pulling away.

While there have been shown and described preferred embodiments of a technique for injection-molding a liner onto a metal spool in accordance with the invention, it will be appreciated that many changes and modifications may be made therein without, however, departing from the essential spirit thereof.

We claim:

1. Apparatus for injection-molding an insulating liner onto the surface of a metal spool to be included in an electromagnetic flowmeter wherein fluid to be metered is conducted through the lined spool the spool being constituted by a cylindrical body having flanges at either end and a pair of diametrically-opposed circular bosses midway between the end flanges to receive the meter electrodes, said apparatus comprising:

A. a mold adapted to receive the spool to define therewith a liner cavity conforming to the inner surface of the cylindrical body and to the faces of the end flanges, the liner cavity communicating with cavities conforming to the inner surface of the electrode bosses, said mold further including a sprue extending from an inlet along the longitudinal axis of the spool toward the central hub of a runner extending radially from the hub to an annular flash gate opening into the liner cavity at a point adjacent the boss cavities, said annular gate being coaxial with said longitudinal axis and being axisymmetric with the sprue; and B. means to inject molten molding material containing reinforcing fibers which are randomly oriented into the inlet to cause the material to flow through the sprue into the hub from which it flows through the runner and the axisymmetric flash gate into the liner cavity wherein the material flows in opposite directions from the gate toward the flanges at either end of the spool body to fill the liner cavity and also the boss cavities, said flow being at a rate causing the reinforcing fibers to assume an orientation in the direction of flow whereby the fibers embedded in the molded in the liner are parallel to the spool.

2. Apparatus as set forth in claim 1 wherein said sprue is tapered outwardly from the inlet to the central hub.

3. Apparatus as set forth in claim 2 wherein said hub extends beyond said runner into a cold well.

4. Apparatus as set forth in claim 1 wherein the wall of the mold which defines the liner cavity in the region of the end flanges has a corrugated formation to create corrugated flange linings.

5. Apparatus as set forth in claim 1 wherein said molding material is a fluorocarbon containing reinforcing fibers.

6. Apparatus as set forth in claim 5 wherein said material is ETFE.

7. Apparatus as set forth in claim 6 wherein said fibers are formed of glass.

* * * * *